United States Patent [19]
Romick et al.

[11] Patent Number: 6,027,751
[45] Date of Patent: Feb. 22, 2000

[54] METHOD FOR PREPARING SHELF-STABLE, TOMATO-BASED FOOD PRODUCTS

[75] Inventors: Tom Romick, Chino Hills; Shanti Kolla, Ontario; Ted Mowery, Laguna Beach; Denise Groussman, Anaheim Hills, all of Calif.

[73] Assignee: ConAgra Grocery Products Company, Fullerton, Calif.

[21] Appl. No.: 09/143,057

[22] Filed: Aug. 28, 1998

[51] Int. Cl.⁷ .................................................. A23L 3/3463
[52] U.S. Cl. .............................. 426/61; 426/52; 426/320; 426/321; 426/330; 426/335
[58] Field of Search ................................ 426/61, 52, 321, 426/320, 330, 335

[56] References Cited

PUBLICATIONS

Fang et al. Inhibitior of *Staphylococcus aureus*, J. of Food Safety, V 17, N 2 (Sep.), p. 69–87, 1997.
Vas, K. The use of Nisin. Proc. Intern. Congr. Food Sci. Technol. 1st, London, 1962, 2, 293–6, 1962.
Zhvaleskii, A. et al. Storage of Tomato Pulp, Konservn. Ovoshchesush. Prom–st.(12), 19–20, 1976.
Brochure "Nisaplin It's Only Natural" cc 1996 Aplin & Barrett.

*Primary Examiner*—Helen Pratt
*Attorney, Agent, or Firm*—Pretty, Schroeder & Poplawski

[57] ABSTRACT

Disclosed is a method for preparing temperature-sensitive, shelf-stable, high-acid or acidified, tomato-based food products. From about 0.000125% to about 0.00125% nisin, and in preferred embodiments from about 0.00025% to about 0.0005% nisin, based on the weight of the food product, is first mixed with the tomato-base. Other ingredients, such as pieces of fresh tomatoes, onions, bell peppers and the like are then combined with the nisin-containing mixture. The combination is then heat-treated at a temperature less than about 180° F.

11 Claims, No Drawings

METHOD FOR PREPARING SHELF-STABLE, TOMATO-BASED FOOD PRODUCTS

BACKGROUND OF THE INVENTION

1. Field of the Invention

This invention relates to a method for preparing tomato-based food products having a pH of less than 4.6 and in particular, it relates to a method for preparing shelf-stable, temperature-sensitive, tomato-based food products having a pH of less than 4.6.

2. Discussion of the Related Art.

Shelf-stable food products are of ever-increasing popularity. Consumers appreciate the convenience of purchasing food products and not having to worry about the products spoiling, before the products can be consumed. But consumers also demand that the shelf-stable products have the taste, appearance, and texture of their freshly prepared counterparts. Consequently, there is a continuing need for processes that provide both long-term stability against changes in the character of the products and, of course, stability against microbial contamination.

High-acid foods are foods that naturally have a pH less than 4.6. Acidified food are foods to which a food acceptable acid, such as citric acid or acetic acid, has been added to bring the pH to below 4.60. Among the most popular high-acid and acidified foods are tomato-based foods, including ketchup and barbeque sauces, as well as salsas, spaghetti sauces, and pizza sauces, which all can contain fresh ingredients, such as tomatoes, onions, bell peppers, and the like, in a tomato base. To ensure that such food products have an adequate shelf-life and do not spoil before they are ultimately consumed, the products can be heat-treated. Heat-treatment typically involves subjecting the food products to elevated temperatures, for example, tomato-based food products are generally pasteurized and hot-filled into individual containers at temperatures in excess of 195° F. High temperature heat-treatment, however, has serious drawbacks. In particular, the use of high temperatures adversely affect the texture, flavor, color, and nutrient quality of the food product.

It is also known to add preservatives to shelf-stable foodstuffs to prolong shelf-life. One such preservative is nisin, an antimicrobial substance produced by certain strains of *Streptococcus lactis*. Nisan is an antimicrobial agent that has been used to control bacterial spoilage in both heat-processed and low-pH foods, including salsa, tomato sauce, and canned vegetables. Nisin, by itself, does not to improve the texture, flavor, and color in temperature-sensitive, high-acid or acidified foods that have been thermally treated at elevated temperatures.

Accordingly, there has existed a definite need for a simple and effective method for preparing temperature-sensitive, shelf-stable, high-acid or acidified, tomato-based foods, such as ketchup, salsas, and barbeque, spaghetti and pizza sauces. There has existed a still further need for such a process that preserves the texture, appearance, nutrient quality, and flavor of freshly their freshly prepared counterparts, while protecting against microbial contamination. The present invention satisfies these and other needs and provides further related advantages.

SUMMARY OF THE INVENTION

Now in accordance with the invention, there has been found a method for preparing temperature-sensitive, shelf-stable, high-acid or acidified, tomato-based food products, such as ketchup, barbeque sauce, spaghetti sauce, pizza sauce, and salsa, with or without fresh ingredients, such as pieces of fresh tomatoes, onions, bell peppers and the like. In accordance with the inventive method, from about 0.000125% to about 0.00125% nisin, and in preferred embodiments from about 0.00025% to about 0.0005% nisin, based on the weight of the food product, is first mixed with the tomato-base. Other ingredients, such as pieces of fresh tomatoes, onions, bell peppers, and the like are then combined with the nisin-containing mixture. Also in some embodiments, the combination contains from about 0.05% to about 0.1% potassium sorbate, based on the weight of the food product.

The combination is heat-treated. High-acid or acidified food products containing fresh ingredients are heat-treated at a temperature of from about 150° F. to about 180° F., preferably from about 160° F. to about 175° F., and more preferably from about 165° F. to about 170° F. High-acid or acidified food products that do not contain fresh ingredients can be heat-treated at temperatures as low as 135° F. The food products are heat-treated for a time sufficient to pasteurize the food product, typically for about 1 minute to about 5 minutes, and make the food product shelf-stable.

The resulting tomato-based food products have a texture, appearance, flavor, and nutrient quality that is substantially the same as their freshly prepared counterparts. Still other features and advantages of the present invention will become apparent from the following detailed description, which illustrates by way of example, the principles of the invention.

DETAILED DESCRIPTION OF THE PREFERRED EMBODIMENTS

Particular embodiments of the invention are described below in some detail for the purpose of illustrating its principles and operation. However, various modifications may be made, and the scope of the invention is not limited to the exemplary embodiments described below. Accordingly, while specific reference is made to a method for making shelf-stable salsa, it can be appreciated that aspects of the invention may be applied to the preparation of other temperature-sensitive, high-acid or acidified, tomato-based foods. For example, a method in accordance with the invention can be used to prepare shelf-stable ketchup, barbeque sauce, spaghetti sauce, and pizza sauces, with or without, added, fresh ingredients.

Salsa contains a tomato base, such as tomato base made from tomato paste and water. From about 0.000125% to about 0.00125% nisin, and in preferred embodiments from about 0.00025% to about 0.0005% nisin, based on the weight of the salsa, is added to the tomato base as a preservative. Nisin is available from Aplin & Barrett under the trademark NISAPLIN. NISAPLIN contains about 2.5 wt. % nisin and about 97.5 wt. % inert ingredients.

Other preservatives, such as potassium sorbate, glycerine, propylene glycol, and parahydroxy benzoic acid can be added to the tomato base. In a preferred embodiment, the tomato base contains from about 0.05% to about 0.1%, based on the weight of the salsa, potassium sorbate. It is an important feature of the inventive process that the nisin, with or without, other preservatives is premixed with water and mixed into the tomato base, before the addition of any other non-preservative ingredients.

In some embodiments, a food acceptable acid, such as citric acid or acetic acid, is added to buffer the tomato base and to assure the pH of the food product remains at 4.6 or below. Also in some embodiments, the tomato base contains a stabilizer, such as pectin, alginate, carrageenan, xanthan or other suitable hydrocolloid.

The tomato base also contains added fresh ingredients, such as fresh vegetables including pieces of fresh tomatoes, onions, bell peppers, and the like. Conventional flavorants are also added to the tomato base. Representative flavorants include salt, sugar, and spices.

After the preservative pre-blend is mixed into the tomato base, the salt, sugar, and other spices are added. The resulting mixture is then preheated, typically at a temperature of about 120° to 130° F. The fresh ingredients are added to this preheated mixture.

The salsa is then heat-treated at a temperature between about 150° F. to about 180° F., preferably from about 160° F. to about 170° F., and more preferably from about 165° F. to about 170° F. The salsa is heat-treated until it is pasteurized, typically for about one to about ten minutes, at ambient pressure. In those embodiments where the tomato-based food product does not contain fresh ingredients, the food product can be heat-treated at temperatures as low as 135° F. The salsa is then packaged and cooled. Because of the low temperatures used for heat- treatment, the shelf-stable salsa has a color, flavor, and vegetable texture, that is much improved when compared to the same salsa heat-treated at 195° F.

The following example is included to further illustrate the invention. It is not a limitation thereon.

EXAMPLE 1

A heat-treated, temperature-sensitive salsa is prepared by the following method. A tomato/water slurry containing 326 lbs. water and 35 lbs. tomato paste is mixed with a preservative pre-mix formed from 0.05 lbs. Nisaplin, 0.5 lbs. potassium sorbate, and water. Next, 15 lbs. salt, 2.5 lbs. sugar, 1 lbs. xanthan gum, 0.5 lbs. citric acid, and 20 lbs. spices are blended with the preservative-containing tomato base. The blend is then preheated to a temperature of about 125° F. and pumped to a batching kettle.

400 lbs. fresh, dewatered, diced (½") tomatoes, 100 lbs. fresh, diced (⅜") onion, 80 lbs. fresh diced (⅜") green pepper, 10 lbs. cilantro, and 10 lbs. lemon juice are then added to the batching kettle and the ingredients thoroughly mixed. The mixture is then heated-treated at a temperature of about 165° F. for 5 minutes.

The heat-treated salsa is filled into containers and cooled. The resulting salsa has a texture, appearance, flavor, and nutrient quality as good as or superior to other commercially produced, shelf-stable salsas.

While the invention has been described in detail with reference to certain preferred embodiments thereof, it will be understood that modifications and variations are within the spirit and scope of that which is described and claimed.

We claim:

1. A method consisting essentially of preparing a temperature-sensitive, shelf-stable, tomato-based food product having a pH of less than 4.6 and containing a tomato base, a preservative, and at least one additional, non-preservative ingredient comprising the steps of: first mixing from about 0.000125% to about 0.00125% nisin preservative, based on the weight of the food product, with the tomato base, combining all additional non-preservative ingredients to the nisin-containing mixture to form a temperature-sensitive, tomato-based food product having a pH of less than 4.6, and then heat-treating the combination to a temperature less than about 180° F. for a time sufficient to make the food product shelf-stable.

2. The method in accordance with claim 1 wherein the food product is ketchup, barbeque sauce, pizza sauce, spaghetti sauce or salsa.

3. The method in accordance with claim 2 wherein from about 0.00025% to about 0.0005% nisin is added to the tomato base, based on the weight of the food product.

4. The method in accordance with claim 1 further comprising premixing the nisin with from about 0.05% to about 0.1% potassium sorbate, based on the weight of the food product.

5. A method consisting essentially of preparing a temperature-sensitive, shelf-stable, tomato-based food product having a pH of less than 4.6 and containing a tomato base, a preservative, and at least one vegetable selected from pieces of fresh tomato, onion, bell pepper, or mixtures thereof, and comprising the steps of: first mixing from about 0.000125% to about 0.00125% nisin preservative, based on the weight of the food product, with the tomato base, combining all additional non-preservative ingredients to the nisin-containing mixture to form a temperature-sensitive, tomato-based food product having a pH of less than 4.6, and then heat-treating the combination to a temperature less than about 180° F. for a time sufficient to make the food product shelf-stable.

6. The method in accordance with claim 5 wherein the combination is heat-treated at a temperature of from about 160° F. to about 170° F.

7. A method consisting essentially of preparing a shelf-stable salsa having a pH less than 4.6 containing a tomato base, a preservative, and at least one vegetable selected from pieces of fresh tomato, onion, bell pepper, or mixtures thereof, and comprising the steps of: first mixing from about 0.000125% to about 0.00125% nisin preservative, based on the weight of the salsa, with the tomato base, combining all additional non-preservative ingredients to the nisin-containing mixture to form salsa having a pH less than 4.6, and then heat-treating the combination at a temperature from about 150° F. to about 180° F. for a time sufficient to make the salsa shelf-stable.

8. The method in accordance with claim 7 wherein from about 0.00025% to about 0.0005% nisin is added to the tomato base, based on the weight of the salsa.

9. The method in accordance with claim 7 further comprising premixing the nisin with from about 0.05% to about 0.1% potassium sorbate, based on the weight of the salsa.

10. The method in accordance with claim 9 wherein the combination is heat-treated at a temperature of from about 160° F. to about 170° F.

11. A method consisting essentially of preparing a shelf-stable salsa having a pH less than 4.6 containing a tomato base, a preservative mixture, and at least one vegetable selected from pieces of fresh tomato, onion, bell pepper, or mixtures thereof, and comprising the steps of: first mixing from about 0.00025% to about 0.0005% nisin and from about 0.05% to about 0.1% potassium sorbate preservatives, based on the weight of the salsa, mixing the preservative mixture with tomato base, combining all additional, non-preservative ingredients to the preservative-containing mixture to form salsa having a pH less than 4.6, and then heat-treating the combination at a temperature from about 160° F. to about 170° F. for a time sufficient to make the salsa shelf-stable.

* * * * *